Feb. 28, 1956  D. C. ASBURY ET AL  2,736,339
ROTARY VALVE
Filed Nov. 28, 1952  3 Sheets-Sheet 1
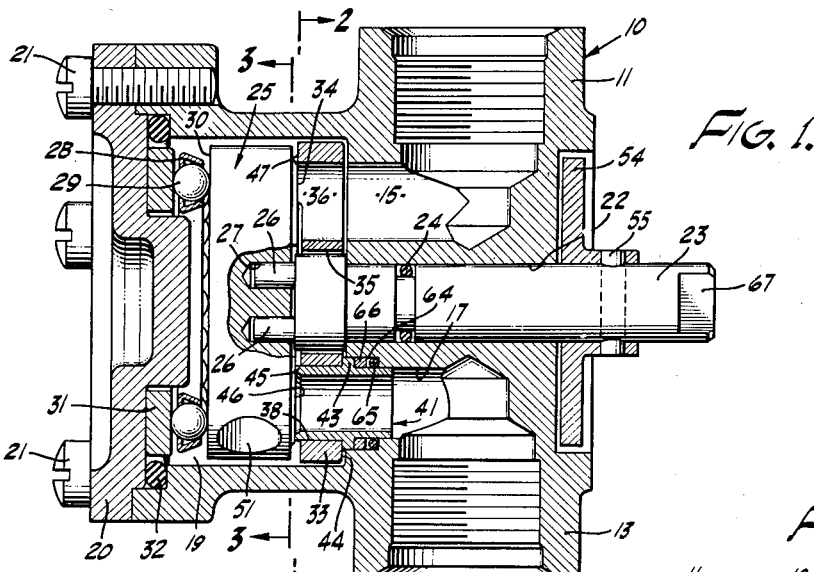
FIG. 1.
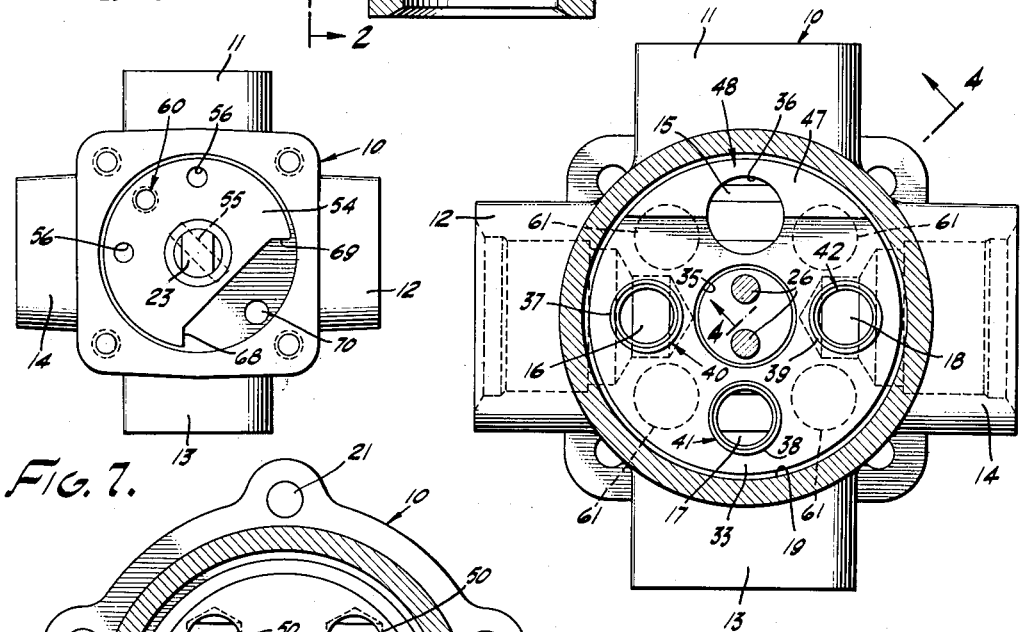
FIG. 2.
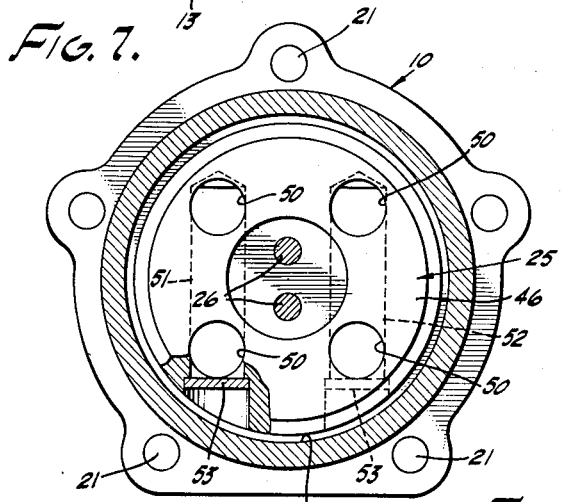
FIG. 7.
FIG. 3.
DONALD C. ASBURY,
THEODORE H. HOLZER,
INVENTORS
BY Lyon & Lyon
ATTORNEYS Feb. 28, 1956  D. C. ASBURY ET AL  2,736,339

ROTARY VALVE

Filed Nov. 28, 1952  3 Sheets-Sheet 2

DONALD C. ASBURY,
THEODORE H. HOLZER,
INVENTORS

BY Lyon & Lyon
ATTORNEYS

DONALD C. ASBURY,
THEODORE H. HOLZER,
INVENTORS

BY Lyon+Lyon
ATTORNEYS

United States Patent Office 2,736,339
Patented Feb. 28, 1956

2,736,339

ROTARY VALVE

Donald C. Asbury and Theodore H. Holzer, Glendale, Calif., assignors, by mesne assignments, to The Parker Appliance Company, Cleveland, Ohio, a corporation of Ohio Application November 28, 1952, Serial No. 323,072

11 Claims. (Cl. 137—624)

This invention relates to valves and is particularly directed to an improved form of rotary selector valve. This invention finds particular usefulness in connection with high pressure hydraulic control systems of the type used in modern aircraft.

The principal object of this invention is to provide a rotary selector valve employing a ported rotor and a nonrotary ported ring assembly.

Another object is to provide a selector valve of this type in which the sealing elements constitute shear rings.

Another object is to provide a device of this type having a carrier ring mounted on the body and provided with a plurality of short tubes sealed with respect to the body and projecting into openings formed in the ring.

Another object is to provide a device of this type in which the tubes project completely through the carrier ring and are provided with ground and lapped surfaces for engagement with the sealing surface of the rotor.

Another object is to provide a carrier ring and tube assembly of this type in which a nonsealing load-balancing surface is provided on the carrier ring for engagement with the rotor in order to balance eccentric forces transmitted by the tubes to the rotor, thereby facilitating turning movement of the rotor.

Another object is to provide a carrier ring in which the tubes do not project completely through the carrier and wherein the carrier is provided with a ground and lapped annular surface for engagement with the sealing surface of the rotor. In this form of our invention there are no intermediate positions of the rotor at which hydraulic fluid can find an unintended path of communication between two valve ports.

Other and more detailed objects and advantages will appear hereinafter.

In the drawings:

Figure 1 is a sectional elevation of a selector valve embodying our invention.

Figure 2 is a transverse sectional view taken substantially on the lines 2—2 as shown in Figure 1.

Figure 3 is a transverse sectional view taken substantially on the lines 3—3 as shown in Figure 1.

Figure 7 is an end view.

Figure 4:
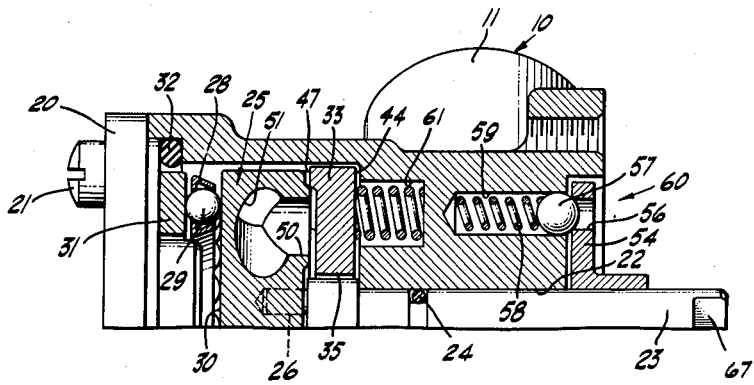
Figure 4 is a sectional detail taken substantially on the lines 4—4 as shown in Figure 2.
Figure 5:
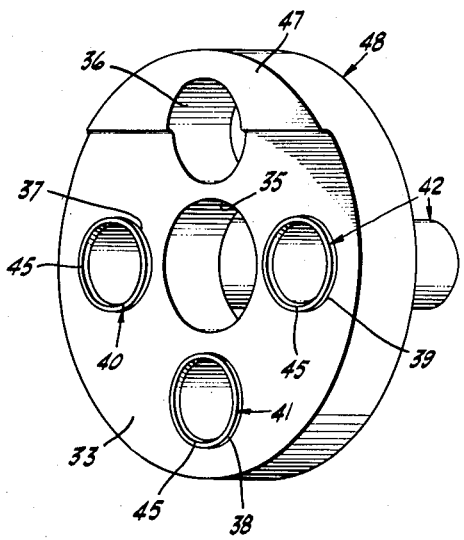
Figure 5 is a perspective view of the carrier ring.
Figure 6:
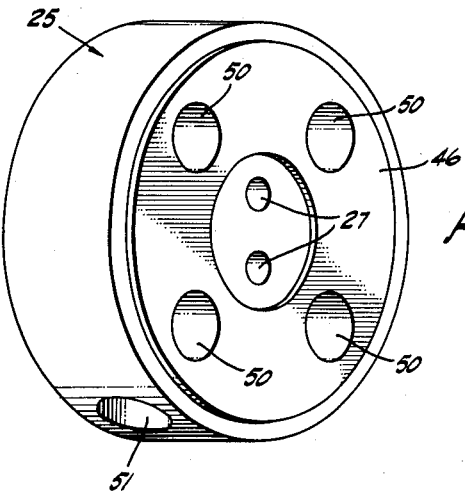
Figure 6 is a perspective view of the sealing surface of the rotor.

Referring to the drawings, the body 10 is provided with a plurality of threaded sockets 11, 12, 13 and 14. Each of the sockets communicates with an axial bore 15, 16, 17 and 18, each communicating with a central cavity 19. A closure 20 connected to the body 10 by threaded fastenings 21 forms one wall of the cavity 19. The body is provided with a central bore 22 also communicating with the cavity 19. This bore 22 receives the rotary shaft 23 and provides a bearing for it. A seal ring 24 on the shaft prevents leakage from the chamber 19 through the bore 22.

A ported rotor 25 is connected to the inner end of the shaft 23 by means of pins 26 which extend from the shaft into sockets 27 provided in the rotor. A thrust bearing assembly 28, including a series of balls 29, is interposed between the end surface 30 of the rotor 25 and an annular race 31 carried on the closure 20. A seal ring 32 prevents leakage between the body 10 and the closure 20.

A carrier ring 33 is positioned within the cavity 19 adjacent the sealing surface 34 of the rotor 25. The carrier ring 33 has a central opening 35 for clearance around the shaft 23. The carrier ring 33 has a plurality of openings extending axially therethrough in alignment with the body bores 15, 16, 17, and 18. Thus, the opening 36 communicates with the body bore 15 and threaded socket 14, and the openings 37, 38, and 39 are axially aligned with the body bores 16, 17, and 18, respectively. Shear tubes 40, 41, and 42 are mounted in the openings 37, 38, and 39 respectively, and project completely through the carrier ring 33. Each of these tubes is provided with a flange 43 which engages the rear side 44 of the carrier ring. Each of the tubes is also provided with a forwardly extending lip 45 which provides a shear surface engagement with the sealing surface 46 on the ported rotor 25. The surface 46 is ground and lapped to an optically flat condition. Similarly the projecting lips 45 on the tubes 40, 41 and 42 are ground and lapped after the tubes have been fixed relative to the carrier ring 33. The tubes are preferably fixed in position by brazing.

The carrier ring 33 is provided with a load-balancing surface 47 which is coplanar with the sealing lips 45 on the tubes 37, 38, and 39. This load-balancing surface is located adjacent the opening 36 in the carrier ring 33. This surface 47 engages the sealing surface 46 on the ported rotor 25 but does not seal the opening 36 because it does not extend completely around the opening 36 nor is it provided with a shear lip. The purpose of the surface 47 is to balance the axial load against the sealing surface 46 on the rotor. If the surface 47 were omitted, the rotor 25 might have a tendency to tilt because the unbalanced thrust of the tube 38 would be eccentric with respect to the rotor axis.

The tubes have sufficient clearance within their respective body bores to enable the carrier ring assembly 48 to have universal self-aligning movement with respect to the rotor 25. Also, the rotor is not rigidly fixed to the shaft 23, but the connection afforded by the pins 26 is loose enough to allow for some misalignment.

The rotor 25 is provided with ports 50 which extend to the sealing surface 46. Each of these ports 50 take the form of an axially extending bore which terminates short of the end surface 30 of the rotor 25. Two of the ports 50 are placed in communication by means of a bore 51 and the other two ports 50 are placed in communication by means of a bore 52. Plugs 53 are provided to close the outer ends of the bores 51 and 52. The ports 50 are so positioned on the rotor 25 that they may be axially aligned with the body bores 15, 16, 17 and 18. Turning movement of the shaft 23 serves to turn the rotor 25 within the cavity 19 to bring the ports 50 into alignment with the body bores to achieve the desired flow through the valve assembly.

The rotor 25 and carrier ring are assembled into position through the opening in the body normally closed by the closure 20. The shaft 23 is inserted axially into the bore 22 and the tubes 40, 41 and 42 pass into their respective body bores 16, 17 and 18 in telescopic relation. The thrust bearing assembly 28 together with the race 31, seal ring 32 and closure 20 are then installed in position.

An index collar 54 is fixed to the projecting end of the shaft 23 by means of a pin 55. As shown in Figure 4, this index collar 54 is provided with detents 56 to receive a ball 57 urged toward the collar by means of a spring 58 mounted in a recess 59. This ball and detent device generally designated 60 serves to maintain the rotor 25 in any selected position with respect to the body 10 and carrier ring 33.

A plurality of recesses 61 are provided on the body 10 and a coil spring 62 is mounted in each of the recesses. The coil springs 62 engage the back face 44 of the carrier ring 33 to pressurize the engagement between lips 45 of the tubes 40, 41 and 42 with the sealing surface 46 on the rotor 25. Each of the tubes is slidably received within its respective body opening and is sealed with respect thereto to prevent leakage. As shown in Figure 1 the tube 41 is slidably received within the body opening 17 and its flange 43 is slidably received within the counter-bore 64. A synthetic rubber O ring 65 and an annular back-up ring 66 provide the seal between the tube 41 and body opening 17. Each of the other tubes 40 and 42 are mounted in the same manner and provided with similar sealing means. In operation the pressure fluid may be supplied through a conduit connected to the socket 13. The return line in the hydraulic system may be connected to socket 11. The rotor 25 may be turned by means of the squared end 67 to connect the body opening 17 with the body opening 16 or 18 as desired. At the same time the other body bore 18 or 16 is connected to the return line through bore 15. The springs 62 hold the shear lips 45 in sealing engagement with surface 46 on the rotor 25 and the very narrow width of the faces on these annular sealing lips forms a tight seal adjacent their respective ports on the rotor. The shaft 23 may be turned in either direction to change the porting as desired and the indexing device 60 ensures that the rotor ports are brought into position of alignment with the shear lips 45. The stop shoulders 68 and 69 on the collar 54, as shown in Figure 7, cooperate with the stationary stop pin 70 on the body to limit turning movement of the shaft 23 and the rotor 25 in both directions.

It will be observed that the body bore 15 and socket 11 leading to the return line are in communication with the cavity 19, whereas each of the body bores 16, 17, and 18 are sealed off from each other and from the cavity 19.

Figure 8:
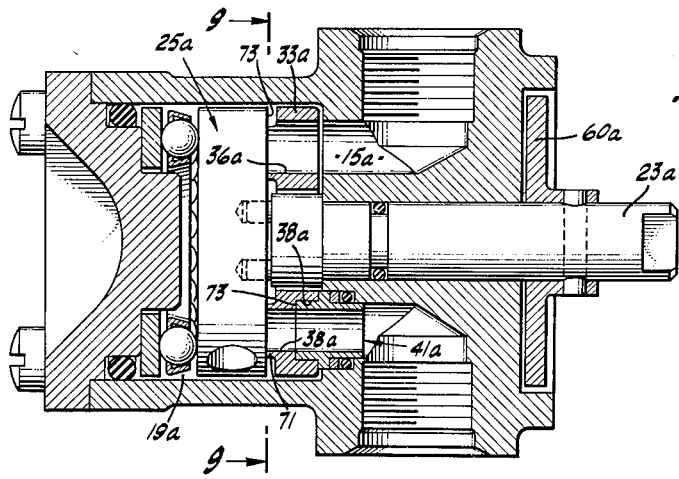
Figure 8 is a sectional view similar to Figure 1 showing a modification.
Figure 11:
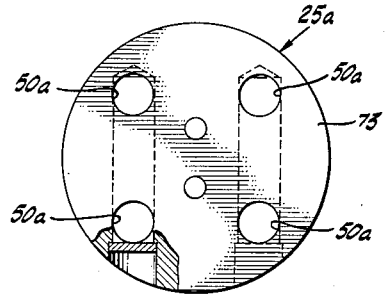
Figure 11 is an end view of the sealing surface of the rotor, partly in section.
Figure 9:
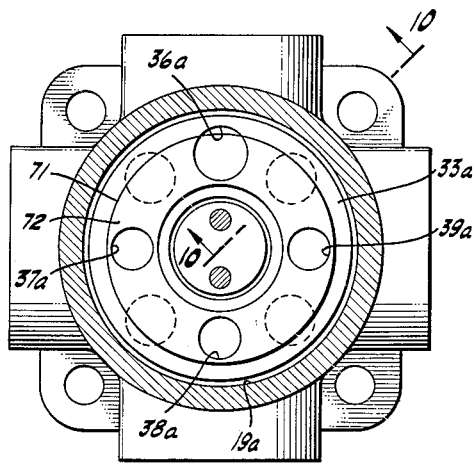
Figure 9 is a sectional view taken substantially on the lines 9—9 as shown in Figure 8.
Figure 10:
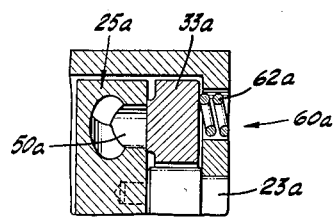
Figure 10 is a fragmental sectional detail taken substantially on the lines 10—10 as shown in Figure 9.
Figure 12:
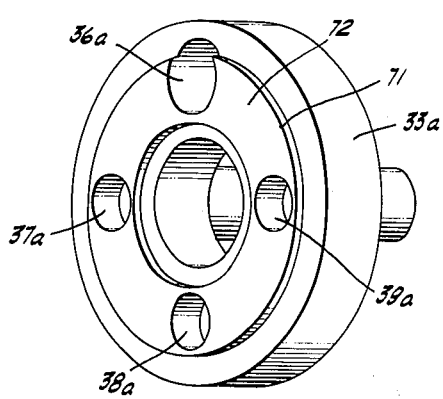
Figure 12 is a perspective view of the carrier ring of Figure 8.

The modified form of our invention shown in Figures 8–12 is similar to the form of our invention previously described with the exception that the sealing tubes do not project completely through the carrier ring 33a. As shown in Figure 8 the tube 41a extends into an opening 38a and engages a shoulder 73 at the end of the opening. Each tube is fixed to the carrier ring 33a by brazing. The carrier ring is provided with an annular projection 71 terminating in a flat sealing surface 72 which is ground and lapped. The openings 37a, 38a, and 39a terminate in this surface 72. The circular sealing face 73 on the rotor 25a engages the surface 72 in sealing relationship and the rotor ports 50a are spaced for registry with openings 37a, 38a, and 39a. The larger opening 36a extends beyond the outer periphery of surface 72 as clearly shown in Figure 12 so that the body bore 15a communicates with the cavity 19a. The shaft 23a, indexing device 60a, and springs 62a, as well as the other parts of the device function in the manner previously described.

Having fully described our invention, it is to be understood that we do not wish to be limited to the details herein set forth, but our invention is of the full scope of the appended claims.

We claim:

1. In a rotary selector valve the combination of: a body, a ported rotor in the body, means extending exteriorly of the body for turning the rotor, the body having flow passage means including a plurality of bores, a non-rotary carrier ring assembly including a ring and a plurality of tubes fixed thereto, each tube extending loosely into one of the body bores, means sealing each tube with respect to its body bore, the rotor having an end surface, and resilient means on the body urging the carrier ring assembly toward sealing engagement with said rotor surface.

2. In a rotary selector valve the combination of: a body having a cavity therein, a ported rotor in the cavity, means extending exteriorly of the body for turning the rotor, the body having flow passage means including a plurality of parallel bores, a non-rotary carrier ring assembly in the cavity including a ring having a plurality of tubes fixed thereto, each tube extending loosely into one of the body bores, means sealing each tube with respect to its body bore, the rotor having an end surface, and resilient means on the body urging the carrier ring assembly toward sealing engagement with said rotor surface.

3. In a rotary selector valve the combination of: a body having a cavity therein, a ported rotor in the cavity, a shaft extending exteriorly of the body and connected to turn the rotor, the body having flow passage means including a plurality of axial bores, a non-rotary carrier ring assembly in the cavity including a ring encircling the shaft and having a plurality of tubes fixed thereto, each tube extending loosely into one of the body bores, means sealing each tube with respect to its body bore, the rotor having an end surface, and resilient means on the body urging the carrier ring assembly toward sealing engagement with said rotor surface.

4. In a rotary selector valve the combination of: a body, a closure removably fixed on the body and cooperating therewith to define a cavity within the body, a ported rotor in the cavity, a shaft extending exteriorly of the body for turning the rotor, the body having flow passage means including a plurality of axial bores, a non-rotary carrier ring assembly in the cavity including a ring encircling the shaft and having a plurality of tubes fixed thereto, each tube extending loosely into one of the body bores, means sealing each tube with respect to its body bore, the rotor having an end surface, resilient means on the body urging the carrier ring assembly towards sealing engagement with said rotor surface, and a thrust bearing assembly interposed between the closure and the rotor to prevent axial movement of the rotor.

5. In a rotary selector valve the combination of: a body, a ported rotor in the body, means extending exteriorly of the body for turning the rotor, the body having flow passage means including a plurality of bores, a non-rotary carrier ring assembly including a ring and a plurality of tubes fixed thereto, each tube extending loosely into one of the body bores and extending into an axial opening in said ring, the ring having an annular sealing surface to which said openings extend, the rotor having a ported end surface for sealing engagement with said annular sealing surface, and resilient means on the body urging said ring surface and rotor surface into pressure contact.

6. In a rotary selector valve the combination of: a body, a ported rotor in the body, a shaft extending exteriorly of the body for turning the rotor, the body having flow passage means including a plurality of axial bores, a non-rotary carrier ring assembly including a ring and a plurality of axial tubes fixed thereto, the ring encircling a portion of the shaft, each tube extending loosely into one of the body bores and extending into an axial opening in said ring, the ring having an annular sealing surface to which said openings extend, the rotor having a ported end surface for sealing engagement with said annular sealing surface, and resilient means on the body urging said ring surface and rotor surface into pressure contact.

7. In a rotary selector valve the combination of: a body, a ported rotor in the body, a shaft extending exteriorly of the body for turning the rotor, the body having flow passage means including a plurality of axial bores, a non-rotary carrier ring assembly including a ring and a plurality of axial tubes fixed thereto, the ring encircling a portion of the shaft, each tube extending loosely into one of the body bores and extending into an axial opening in said ring, the ring having an annular sealing surface to which said openings extend, the rotor having a ported end surface for sealing engagement with said annular sealing surface, resilient means on the body urging said ring surface and rotor surface into pressure contact, a collar fixed on the shaft exteriorly of the body, and cooperating parts on the body and collar providing indexing means for said ported rotor.

8. The combination set forth in claim 1 in which said tubes extend through said ring and each is provided with a lip for contacting the rotor surface.

9. The combination set forth in claim 4 in which said tubes extend through said ring and each is provided with a lip for contacting the rotor surface.

10. The combination set forth in claim 1 wherein said tubes extend through said ring, each of the tubes having a lip for contacting the rotor surface, and the ring having a load-balancing surface thereon also engaging the rotor surface.

11. The combination set forth in claim 4 wherein said tubes extend through said ring, each of the tubes having a lip for contacting the rotor surface, and the ring having a load-balancing surface thereon also engaging the rotor surface.

References Cited in the file of this patent

UNITED STATES PATENTS

| | | |
|---|---|---|
| 1,971,187 | Jacobson | Aug. 21, 1934 |
| 2,317,407 | Samiran | Apr. 27, 1943 |
| 2,377,473 | Wolcott | June 5, 1945 |
| 2,519,574 | Holl | Aug. 22, 1950 |